(12) United States Patent
Lin et al.

(10) Patent No.: US 10,050,244 B2
(45) Date of Patent: Aug. 14, 2018

(54) BATTERY MODULE

(71) Applicant: CONTEMPORARY AMPEREX TECHNOLOGY CO., LIMITED, Ningde (CN)

(72) Inventors: Qinhong Lin, Ningde (CN); Yanhuo Xiang, Ningde (CN); Min Chen, Ningde (CN); Derong Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 246 days.

(21) Appl. No.: 15/190,014

(22) Filed: Jun. 22, 2016

(65) Prior Publication Data
US 2017/0012259 A1    Jan. 12, 2017

(30) Foreign Application Priority Data

Jul. 8, 2015  (CN) .................... 2015 2 0487720 U (51) Int. Cl.
*H01M 10/052* (2010.01)
*H01M 2/10* (2006.01)

(52) U.S. Cl.
CPC ............................... *H01M 2/1077* (2013.01)

(58) Field of Classification Search
CPC .......................... H01M 10/052; H01M 2/1077
See application file for complete search history.

(56) References Cited

FOREIGN PATENT DOCUMENTS

CN          203631621 U       6/2014

*Primary Examiner* — Olatunji Godo
(74) *Attorney, Agent, or Firm* — Morgan, Lewis & Bockius LLP (57) ABSTRACT

The present disclosure provides a battery module comprising a plurality of mono-batteries arranged side by side; two end plates positioned at two opposite ends respectively; two side plates positioned at a front side and a rear side respectively and securely connected to the two end plates; a bottom plate positioned under the plurality of mono-batteries and securely connected to the two end plates and the two side plates; a plurality of insulating spacers provided on each side plate, each insulating spacer extends in an up-down direction, and the two adjacent insulating spacers on each side plate receive one side of one corresponding mono-battery in a front-rear direction; a plurality of insulating bonding materials, each insulating bonding material is provided between the two adjacent insulating spacers on each side plate, so as to bond one side surface of one corresponding mono-battery in the front-rear direction.

11 Claims, 10 Drawing Sheets

BATTERY MODULE

REFERENCE To RELATED APPLICATIONS

The present application claims priority to Chinese patent application No. 201520487720.5, filed on Jul. 8, 2015, which is incorporated herein by reference in its entirety.

FIELD OF THE PRESENT DISCLOSURE

The present disclosure relates to the field of energy storage devices, and particularly relates to a battery module.

BACKGROUND OF THE PRESENT DISCLOSURE

Figure 1:
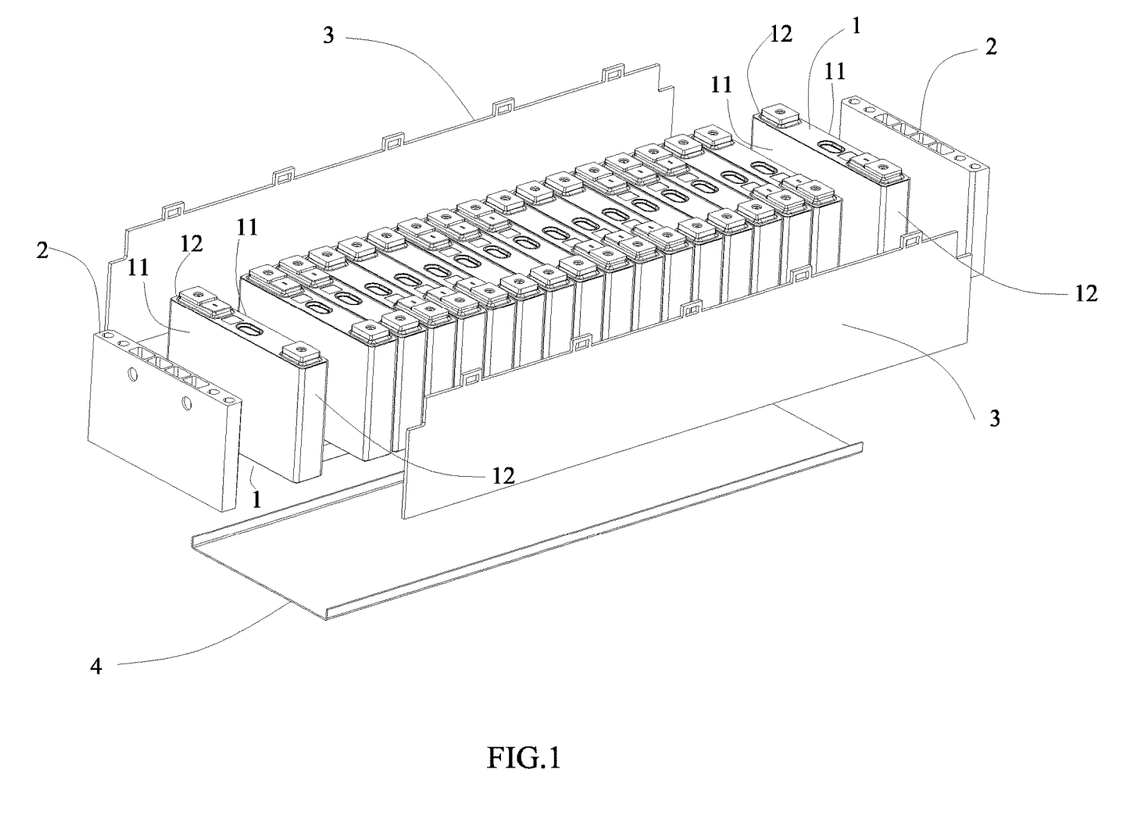
FIG. 1 is an exploded perspective view of a battery module of the prior art.

With the requirement on low-carbon protection in modern society, the power battery tends to be used more and more widely, and the most notable feature of the power battery in the fields of electric vehicles and energy storage power station lies in modularized assembling, that is, a battery module is assembled by a plurality of mono-batteries (as shown in FIG. 1), then a plurality of battery modules are connected in series and/or in parallel and received in a case so as to form a battery pack. A bonding material (not shown) is typically applied on both end surfaces 11 of each mono-battery 1, then the plurality of mono-batteries 1 and two end plates 2 are bonded together in an arrangement manner as shown in FIG. 1, so as to provide a larger bonding area. In each mono-battery 1, because the surface area of each of the two end surfaces 11 is the largest, the bonding area is the largest when the bonding material is applied on the end surface 11. However, since the plurality of mono-batteries 1 are arranged sequentially and closely adjacent to each other, there is no space to buffer swelling of any one mono-battery 1; since each mono-battery 1 will generate different extent of swelling during charging and discharging, a large load will be generated and applied to a frame (the frame is formed by the two end plates 2 and two side plates 3) due to the swelling of all the mono-batteries 1, and the frame will be deformed and in turn will fail, so such a configuration is not suitable for the design of the battery module in a situation that the mono-battery 1 swells seriously. Meanwhile the load from all the mono-batteries 1 will be finally applied to the two end plates 2 via the two bonding materials which are respectively positioned between the two mono-batteries 1 and the two end plates 2, and in turn will be transferred to the other battery modules of the battery pack via these two end plates 2. In order to maintain the secure bonding between all the mono-batteries 1 and the two end plates 2 and in turn maintain the structure stability of the frame of the battery module, the requirement on bonding strength of the adhesive of the bonding material used for each battery module is very high, and the requirement on structure strength of the frame of the battery module is also very high. The structural design is not suitable for the design that the battery module works in severe condition (for example, the battery module will bear a higher impact load or a long time vibration load for the electric vehicle) and the number of the mono-batteries 1 is large. At the same time, a bottom plate 4 is not directly connected with the other metal components (the end plates 2 and the side plates 3) of the battery module, so all the metal components of the battery module do not have an equipotential design, and in turn the equipotential design must be later designed for the battery pack, which is not convenient in the design of the battery pack.

SUMMARY OF THE PRESENT DISCLOSURE

In view of the problem existing in the background, an object of the present disclosure is to provide a battery module, which can reduce the effect on a frame of the battery module due to the swelling of a mono-battery, improve the structure stability of the frame of the battery module, and lower requirement on the strength of the frame of the battery module.

Another object of the present disclosure is to provide a battery module, which can lower the requirement on the bonding strength of an adhesive of a bonding material on the battery module.

Still another object of the present disclosure is to provide a battery module, which is applicable to a situation that the mono-battery swells seriously.

In order to achieve the above object, the present disclosure provides a battery module which comprises: a plurality of mono-batteries arranged side by side; two end plates positioned at two opposite ends of the plurality of mono-batteries in an arrangement direction of the plurality of mono-batteries respectively; two side plates positioned at a front side and a rear side of the plurality of mono-batteries respectively and securely connected to the two end plates to form a frame; a bottom plate positioned under the plurality of mono-batteries and securely connected to the two end plates and the two side plates; a plurality of insulating spacers provided on each side plate, each insulating spacer extends in an up-down direction, and the two adjacent insulating spacers on each side plate receive one side of one corresponding mono-battery in a front-rear direction, so that the two adjacent mono-batteries are spaced apart from each other by the two insulating spacers which are respectively provided on the two side plates, and each end plate and the corresponding mono-battery are spaced apart from each other by the two insulating spacers which are respectively provided on the two side plate; and a plurality of insulating bonding materials, each insulating bonding material is provided between the two adjacent insulating spacers on each side plate, so as to bond one side surface of one corresponding mono-battery in the front-rear direction.

The present disclosure has the following beneficial effects: in the battery module according to the present disclosure, the two adjacent mono-batteries are spaced apart from each other by the two insulating spacers which are respectively provided on the two side plates, and each end plate and the corresponding mono-battery are spaced apart from each other by the two insulating spacers which are respectively provided on the two side plates, so as to provide a space between the two adjacent mono-batteries and a space between each end plate and the corresponding mono-battery to buffer and release the swelling of the each associated mono-battery, even though each mono-battery will generate different extent of swelling during charging and discharging, the swelling of all the mono-batteries will be buffered and released due to these spaces, so that a large load will not be generated and applied to the frame (the frame is formed by the two end plates and the two side plates) of the battery module, deformation of the frame is lowered and in turn the failure of the frame is avoided, the structure stability of the frame of the battery module is improved, and the requirement on the strength of the frame of the battery module is lowered. In addition, the battery module of the present disclosure may also be applicable to a situation that the mono-battery swells seriously.

REFERENCE NUMERALS ARE REPRESENTED AS FOLLOWS:

1 mono-battery
11 end surface
12 side surface
2 end plate
21 through-hole
3 side plate
31 positioning hole
32 bottom portion
4 bottom plate
41 penetrating hole
5 insulating spacer
51 protrusion
6 insulating bonding material

DETAILED DESCRIPTION

Hereinafter a battery module according to the present disclosure will be described in combination with the figures.

Referring to FIGS. 2-11, a battery module according to the present disclosure comprises: a plurality of mono-batteries 1 arranged side by side; two end plates 2 positioned at two opposite ends of the plurality of mono-batteries 1 in an arrangement direction of the plurality of mono-batteries 1 respectively; two side plates 3 positioned at a front side and a rear side of the plurality of mono-batteries 1 respectively and securely connected to the two end plates 2 to form a frame; a bottom plate 4 positioned under the plurality of mono-batteries 1 and securely connected to the two end plates 2 and the two side plates 3; a plurality of insulating spacers 5 provided on each side plate 3, each insulating spacer 5 extends in an up-down direction, and the two adjacent insulating spacers 5 on each side plate 3 receive one side of one corresponding mono-battery 1 in a front-rear direction, so that the two adjacent mono-batteries 1 are spaced apart from each other by the two insulating spacers 5 which are respectively provided on the two side plates 3, and each end plate 2 and the corresponding mono-battery 1 are spaced apart from each other by the two insulating spacers 5 which are respectively provided on the two side plate 3; and a plurality of insulating bonding materials 6, each insulating bonding material 6 is provided between the two adjacent insulating spacers 5 on each side plate 3, so as to bond one side surface 12 of one corresponding mono-battery 1 in the front-rear direction.

In the battery module according to the present disclosure, the two adjacent mono-batteries 1 are spaced apart from each other by the two insulating spacers 5 which are respectively provided on the two side plates 3, and each end plate 2 and the corresponding mono-battery 1 are spaced apart from each other by the two insulating spacers 5 which are respectively provided on the two side plates 3, so as to provide a space between the two adjacent mono-batteries 1 and a space between each end plate 2 and the corresponding mono-battery 1 to buffer and release the swelling of the each associated mono-battery 1, even though each mono-battery 1 will generate different extent of swelling during charging and discharging, the swelling of all the mono-batteries 1 will be buffered and released due to these spaces, so that a large load will not be generated and applied to the frame (the frame is formed by the two end plates 2 and the two side plates 3) of the battery module, deformation of the frame is lowered and in turn the failure of the frame is avoided, the structure stability of the frame of the battery module is improved, and the requirement on the strength of the frame of the battery module is lowered. In addition, the battery module of the present disclosure may also be applicable to a situation that the mono-battery 1 swells seriously.

In the battery module according to the present disclosure, each side of each mono-battery 1 is bonded on the side plate 3 via the insulating bonding material 6 between the two adjacent insulating spacers 5, because the two adjacent mono-batteries 1 are spaced apart from each other by the two insulating spacers 5 which are respectively provided on the two side plates 3, and each end plate 2 and the corresponding mono-battery 1 are spaced apart from each other by the two insulating spacers 5 which are respectively provided on the two side plates 3, the swelling of each the mono-battery 1 can be buffered and released, and the structure stability of the frame of the battery module is improved, the two insulating bonding materials 6 which each are positioned between the two adjacent insulating spacer 5 and which are respectively provided on the two side plates 3 only need to bear the gravity of one corresponding mono-battery 1, and thus it does not have to maintain the secure bonding between all the mono-batteries 1 and the two end plates 2 as the prior art, and the structure stability of the frame of the battery module is maintained, and the requirement on bonding strength of an adhesive of the bonding material for the battery module is reduced.

In an embodiment of the battery module according to the present disclosure, referring to FIG. 2 and FIGS. 9-11, each end plate 2 is provided with through-holes 21 which extend in the up-down direction; both ends of the bottom plate 4 in the arrangement direction of the plurality of mono-batteries 1 are provided with corresponding penetrating holes 41; a plurality of battery modules (not shown) are stacked in the up-down direction and connected together by screws (not shown) which each pass through the through-hole 21 of corresponding end plate 2 and the penetrating hole 41 of the bottom plate 4 of each battery module, so as to form a battery pack, and at the same time, the bottom plate 4 is securely connected to the two end plates 2 and the two side plates 3 in each battery module. The connection of the screws allows the two end plates 2 to abut against the bottom plate 4 tightly under the force applied by the screws.

In an embodiment of the battery module according to the present disclosure, the two side plates 3 may be securely connected to the two end plates 2 by laser welding or cold metal transfer (CMT) welding.

In an embodiment of the battery module according to the present disclosure, referring to FIG. 2, FIG. 3, FIG. 5 and FIG. 6, each side plate 3 is provided with a plurality of positioning holes 31; each insulating spacer 5 has a protrusion 51; the protrusion 51 of each insulating spacer 5 is inserted and fixed to the positioning hole 31 of the side plate 3, so that each insulating spacer 5 is fixed to the corresponding side plate 3. The insulating spacer 5 not only limits the flow of an adhesive of the insulating bonding material 6 between the mono-battery 1 and the corresponding side plate 3 when the mono-battery 1 is bonded on the side plate 3 via the insulating bonding material 6, but also facilitates controlling on applying the bonding material 6.

Figure 6:
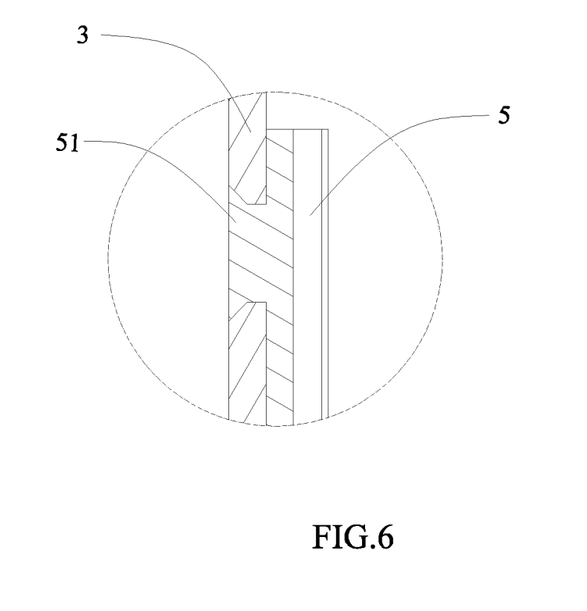
FIG. 6 is a cross sectional view of a hot riveting region between the side plate and the insulating spacer of the battery module according to the present disclosure.

In an embodiment of the battery module according to the present disclosure, referring to FIG. 6, each protrusion 51 of each insulating spacer 5 is fixed to one positioning hole 31 of the side plate 3 by hot riveting.

In an embodiment of the battery module according to the present disclosure, referring to FIG. 2, FIG. 3, FIG. 5 and FIG. 6, the number of the protrusions 51 of the each insulating spacer 5 is two and the two protrusions 51 are closed to an upper end and an lower end of each insulating spacer 5 respectively.

Figure 11:
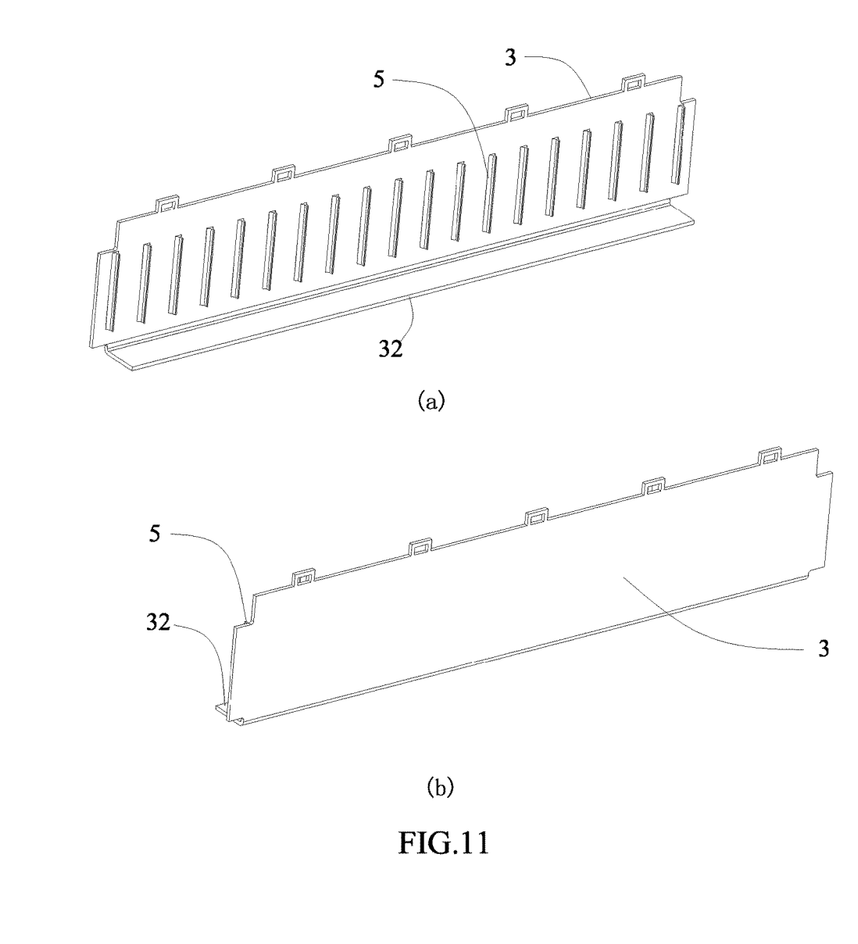
FIG. 11 is a pair of perspective views of one side plate and the insulating spacers provided on the one side plate of the battery module according to the present disclosure, in which (a) is a perspective view viewed from the mono-battery side; and (b) is a perspective view viewed from the outside of the battery module.

In an embodiment of the battery module according to the present disclosure, referring to FIG. 11, each side plate 3 and the plurality of insulating spacers 5 provided on each side plate 3 are integrally formed, so each side plate 3 need not be provided with the positioning holes 31 at this time. In an embodiment, the integral formation may be performed by composite injection molding.

Figure 7:
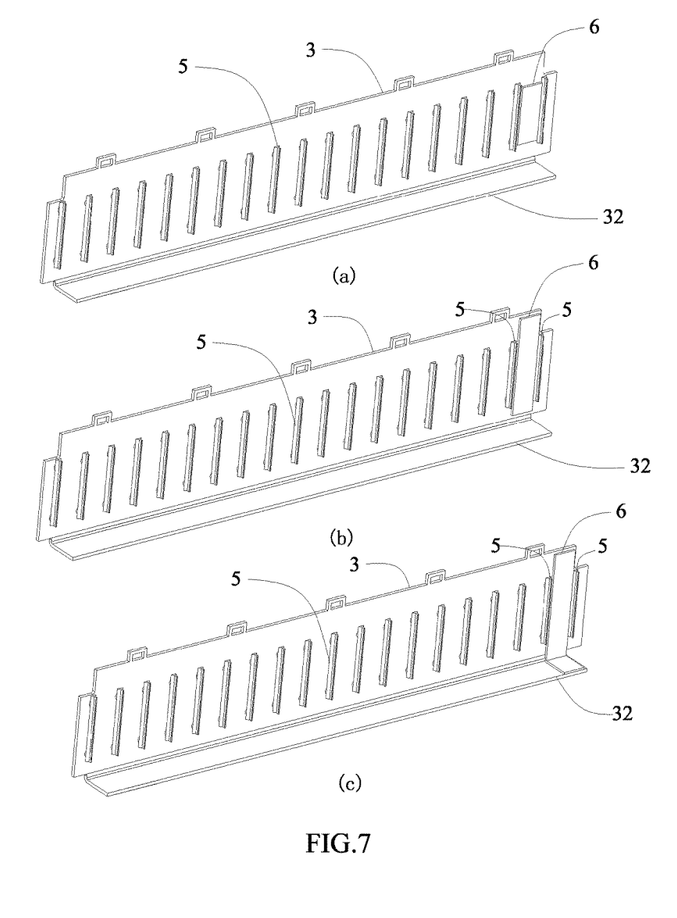
FIG. 7 is a set of three perspective views illustrating an insulating bonding material is provided between the two adjacent insulating spacers of the battery module according to the present disclosure, in which (a) is a perspective view illustrating that the insulating bonding material does not extend beyond the two adjacent insulating spacers in an up-down direction, (b) is a perspective view illustrating that the insulating bonding material extends beyond the two adjacent insulating spacers in the up-down direction, and (c) is a perspective view illustrating that the insulating bonding material further extends to a bottom portion, which is bent and extends, of the side plate.
Figure 8:
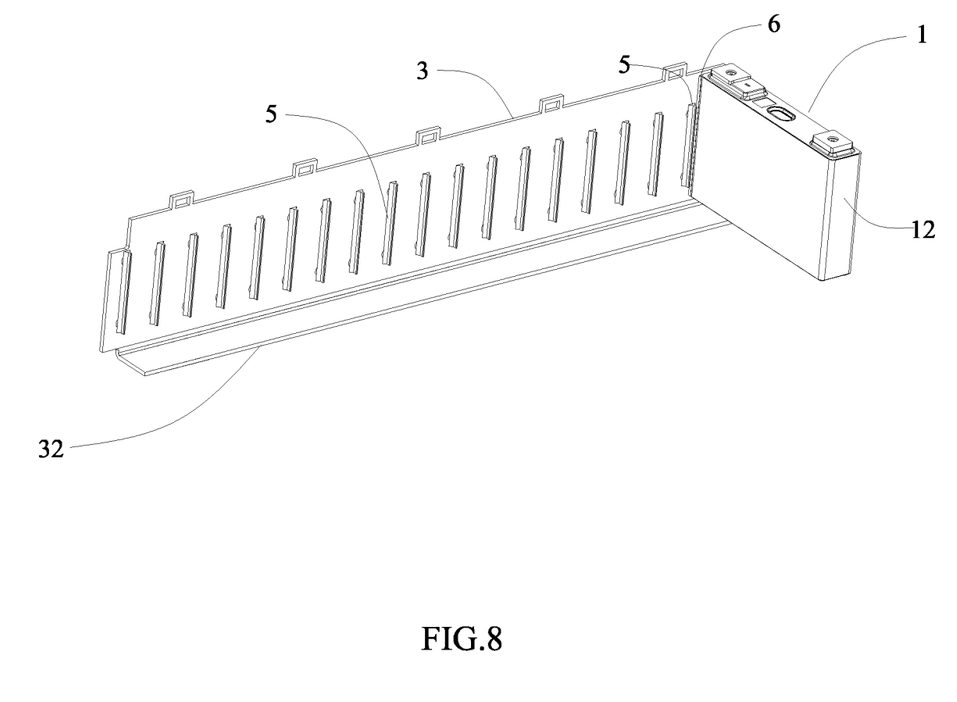
FIG. 8 is a perspective view illustrating that a mono-battery is bonded between the two insulating spacers in the battery module according to the present disclosure, in which only one mono-battery is shown for the sake of clarity.
Figure 9:
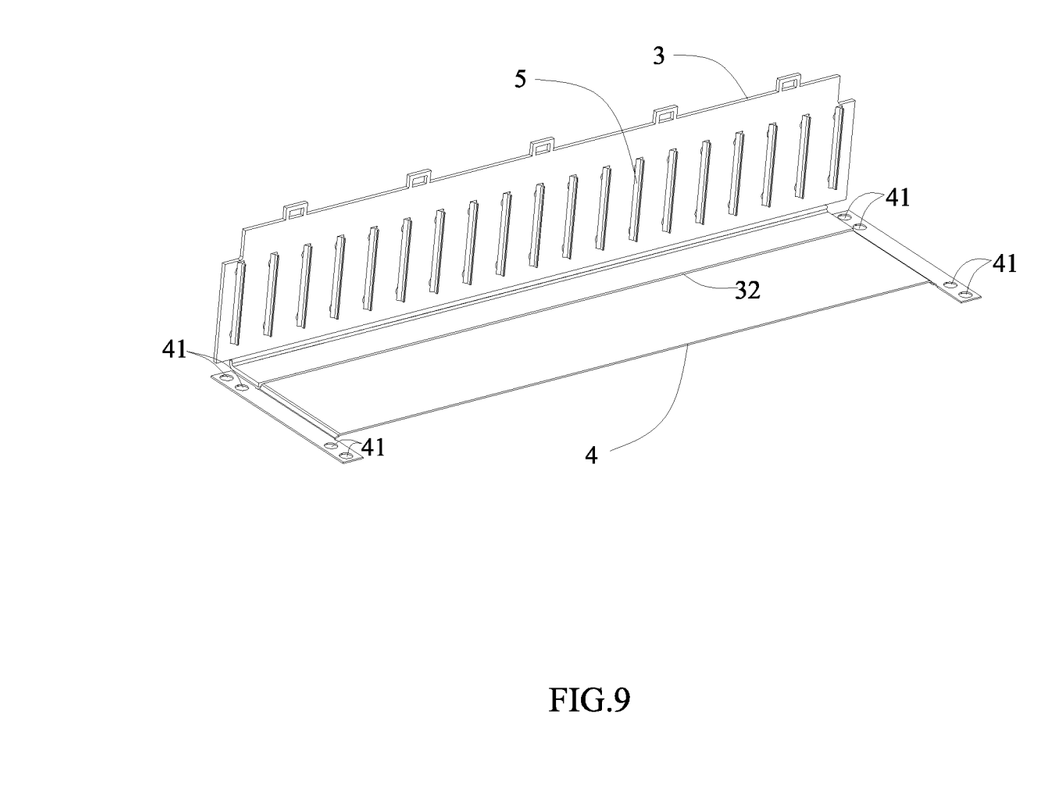
FIG. 9 is a schematic view illustrating an assembling relationship between the side plate and a bottom plate of the battery module according to the present disclosure.
Figure 10:
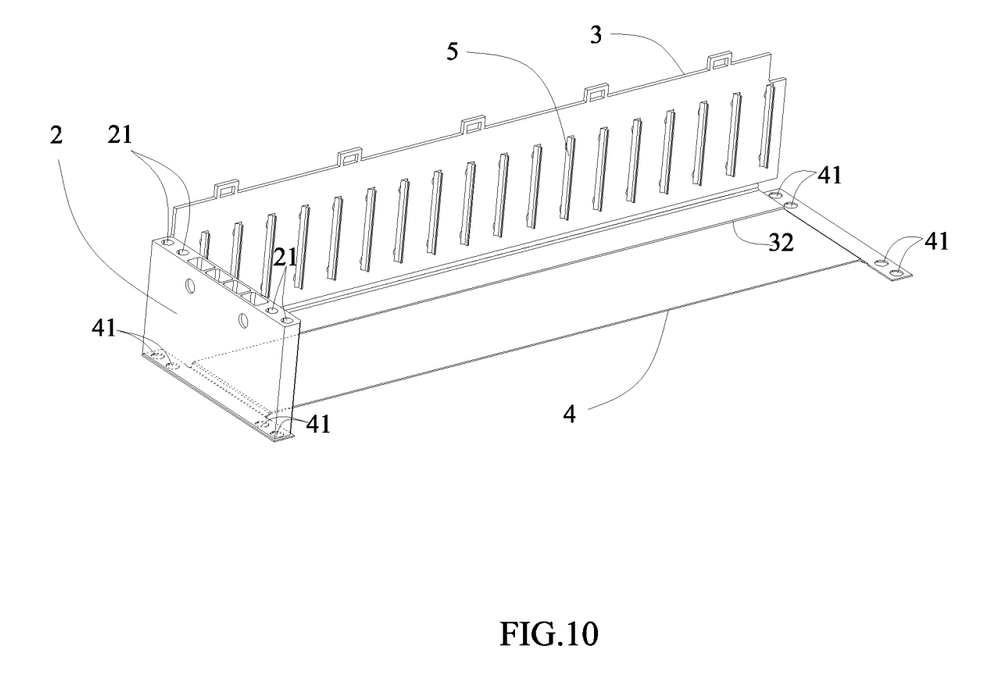
FIG. 10 is a schematic view illustrating an assembling relationship among the side plate, the bottom plate and an end plate of the battery module according to the present disclosure.

In an embodiment of the battery module according to the present disclosure, referring to FIG. (a) of FIG. 7, the insulating bonding material 6 provided between the two adjacent insulating spacers 5 does not extend beyond the two adjacent insulating spacers 5 in the up-down direction. Thus the flow of an adhesive of the insulating bonding material 6 will be only limited in a region surrounded by the two insulating spacer 5, which facilitates controlling on applying the bonding material 6.

In an embodiment of the battery module according to the present disclosure, referring to FIG. (b) of FIG. 7, the insulating bonding material 6 provided between the two adjacent insulating spacers 5 extends beyond the two adjacent insulating spacers 5 in the up-down direction. Thus it may increase the bonding area between the insulating bonding material 6 and the side surface 12 of the mono-battery 1, and allow the mono-battery 1 to be more securely bonded on the each side plate 3.

Figure 2:
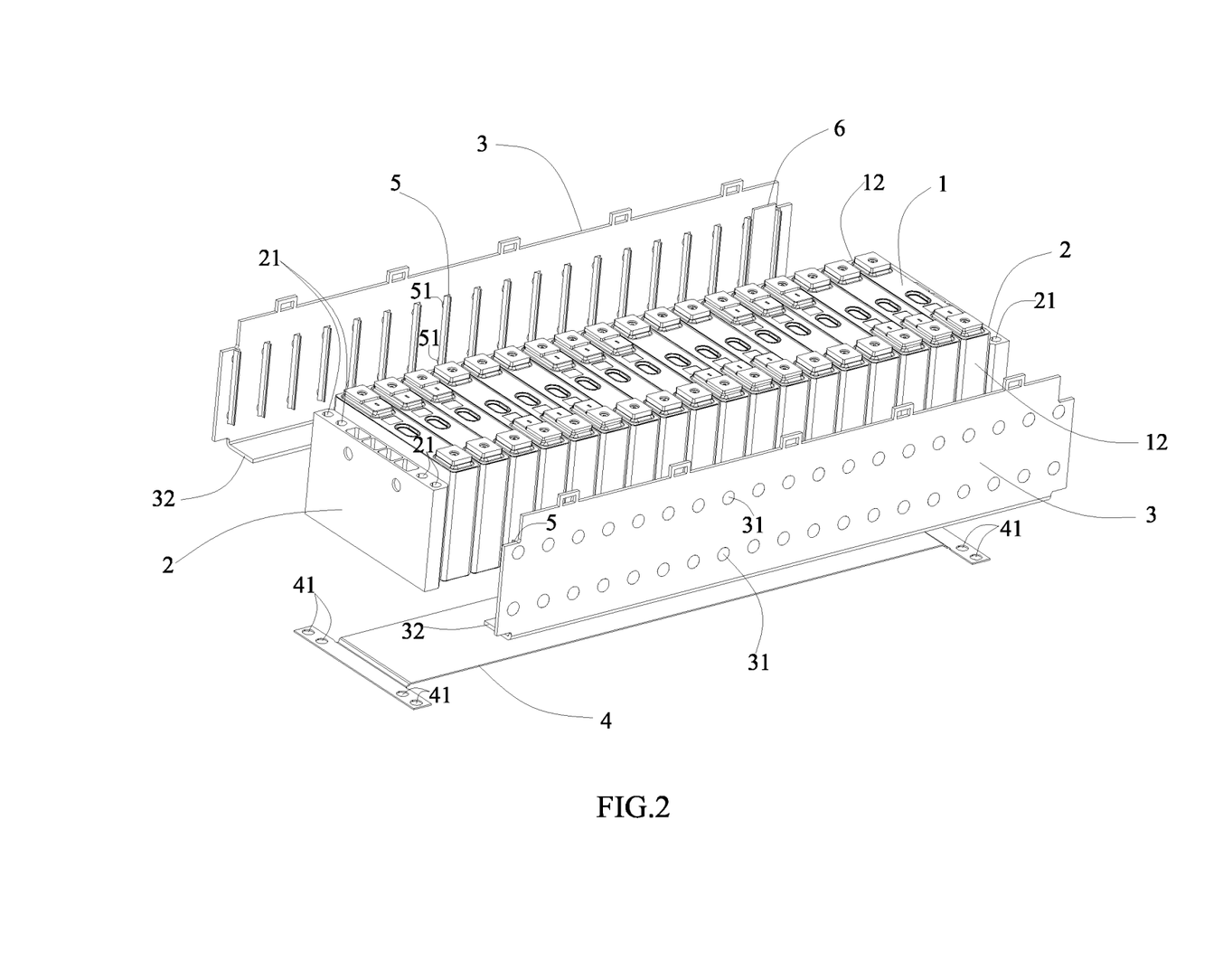
FIG. 2 is an exploded perspective view of a battery module according to the present disclosure.
Figure 3:
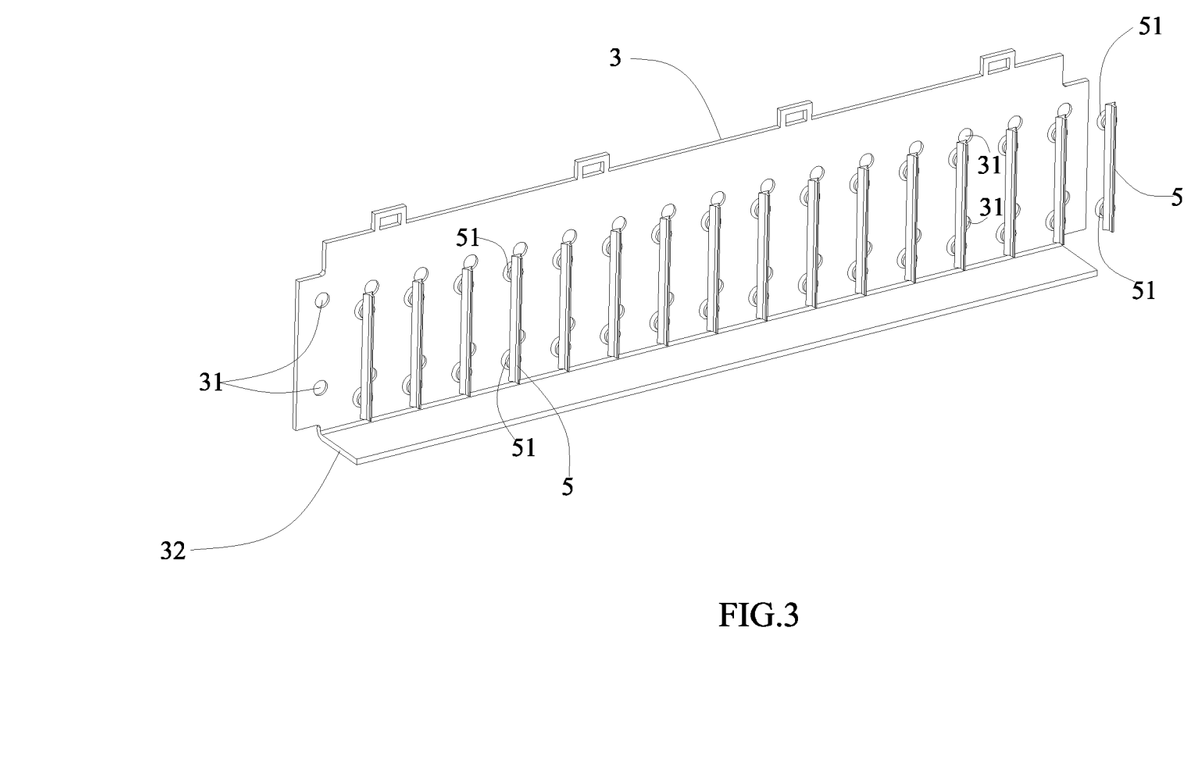
FIG. 3 is a perspective view of a side plate and insulating spacers of the battery module according to the present disclosure before the insulating spacers are assembled to the side plate.
Figure 4:
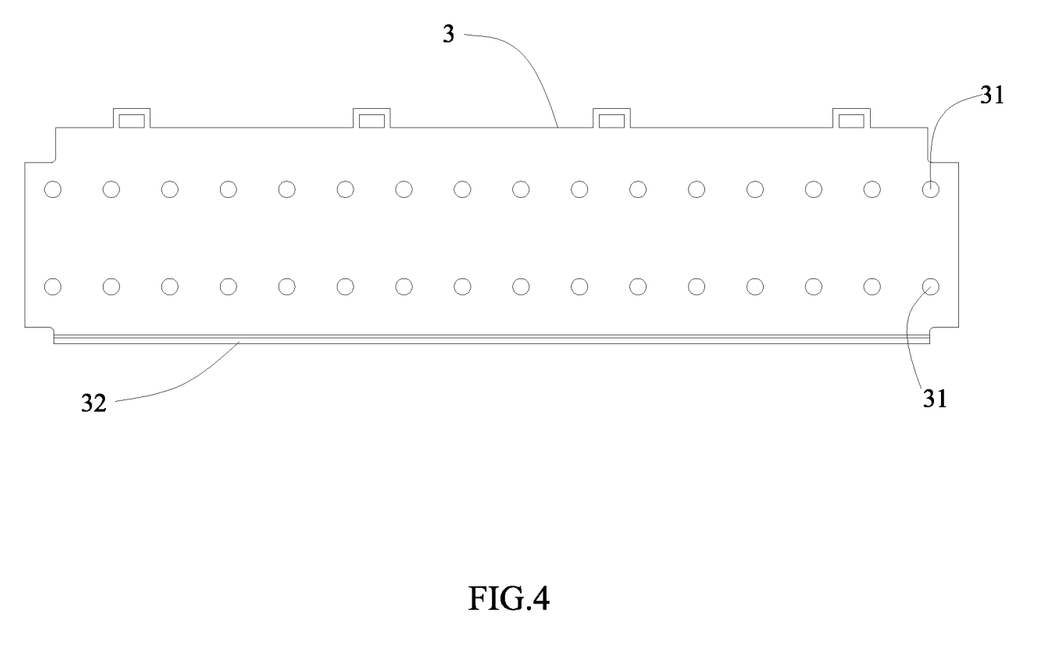
FIG. 4 is a rear view of one side plate of FIG. 3.
Figure 5:
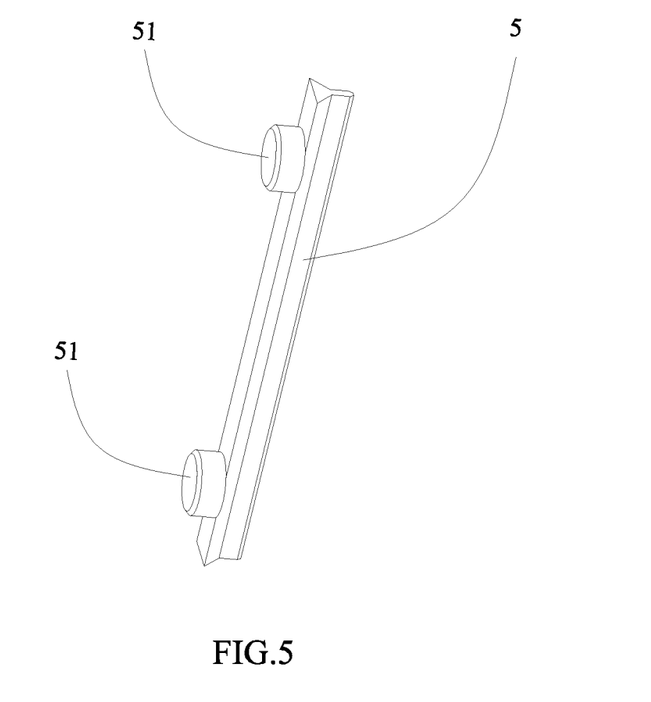
FIG. 5 is a perspective view of the insulating spacer according to the present disclosure.

In an embodiment of the battery module according to the present disclosure, referring to FIGS. 2-4, FIG. (c) of FIG. 7 and FIGS. 8-11, each side plate 3 may have a bottom portion 32 which is bent and extends to under the plurality of mono-batteries 1. Thus it may improve the rigidity of the each side plate 3.

In an embodiment of the battery module according to the present disclosure, referring to FIG. (c) of FIG. 7, the insulating bonding material 6 provided between the two adjacent insulating spacers 5 may further extend onto the bent bottom portion 32 of the side plate 3 and may be bonded to the corresponding one mono-battery 1 from under the corresponding one mono-battery 1. Thus it may further improve the structure strength of the battery module.

In an embodiment of the battery module according to the present disclosure, each end plate 2, each side plate 3 and the bottom plate 4 are metal plates respectively. The bottom plate 4 is securely connected to the two end plates 2 and the two side plates 3, so the equipotential design of these metal plates of the battery module can be achieved, and no equipotential design is required in later design of the battery pack, the whole design of the battery pack is simplified. Each end plate 2 may be a steel plate. Each side plate 3 may be an aluminum plate. The bottom plate 4 may be an aluminum plate.

In the battery module according to the present disclosure, each insulating spacer 5 may be a plastic plate.

In the battery module according to the present disclosure, each mono-battery 1 may have a hard shell. The hard shell of each mono-battery 1 may be made of aluminum or steel. Each mono-battery 1 may be cuboid in shape.

What is claimed is:

1. A battery module, comprising:
   a plurality of mono-batteries arranged side by side;
   two end plates positioned at two opposite ends of the plurality of mono-batteries in an arrangement direction of the plurality of mono-batteries respectively;
   two side plates positioned at a front side and a rear side of the plurality of mono-batteries respectively and securely connected to the two end plates to form a frame;
   a bottom plate positioned under the plurality of mono-batteries and securely connected to the two end plates and the two side plates;
   a plurality of insulating spacers provided on each side plate, each insulating spacer extending in an up-down direction, and the two adjacent insulating spacers on each side plate receiving one side of one corresponding mono-battery in a front-rear direction, so that the two adjacent mono-batteries being spaced apart from each other by the two insulating spacers which are respectively provided on the two side plates, and each end plate and the corresponding mono-battery being spaced apart from each other by the two insulating spacers which are respectively provided on the two side plate; and
   a plurality of insulating bonding materials, each insulating bonding material being provided between the two adjacent insulating spacers on each side plate, so as to bond one side surface of one corresponding mono-battery in the front-rear direction.

2. The battery module according to claim 1, wherein each end plate is provided with through-holes which extend in the up-down direction;

both ends of the bottom plate in the arrangement direction of the plurality of mono-batteries are provided with corresponding penetrating holes;

a plurality of battery modules are connected together by screws which each pass through the through-hole of corresponding end plate and the penetrating hole of the bottom plate of each battery module, so as to form a battery pack.

3. The battery module according to claim 1, wherein each side plate is provided with a plurality of positioning holes;

each insulating spacer has a protrusion;

the protrusion of each insulating spacer is inserted and fixed to the positioning hole of the side plate, so that each insulating spacer is fixed to the corresponding side plate.

4. The battery module according to claim 3, wherein each protrusion of each insulating spacer is fixed to one positioning hole of the side plate by hot riveting.

5. The battery module according to claim 1, wherein each side plate and the plurality of insulating spacers provided on each side plate are integrally formed.

6. The battery module according to claim 1, wherein the insulating bonding material provided between the two adjacent insulating spacers does not extend beyond the two adjacent insulating spacers in the up-down direction.

7. The battery module according to claim 1, wherein the insulating bonding material provided between the two adjacent insulating spacers extends beyond the two adjacent insulating spacers in the up-down direction.

8. The battery module according to claim 1, wherein each side plate may have a bottom portion which is bent and extends to under the plurality of mono-batteries.

9. The battery module according to claim 8, wherein the insulating bonding material provided between the two adjacent insulating spacers further extends onto the bent bottom portion of the side plate and is bonded to the corresponding one mono-battery from under the corresponding one mono-battery.

10. The battery module according to claim 1, wherein each end plate, each side plate and the bottom plate are metal plates respectively.

11. The battery module according to claim 2, wherein each end plate, each side plate and the bottom plate are metal plates respectively.

* * * * *